Figure 1:
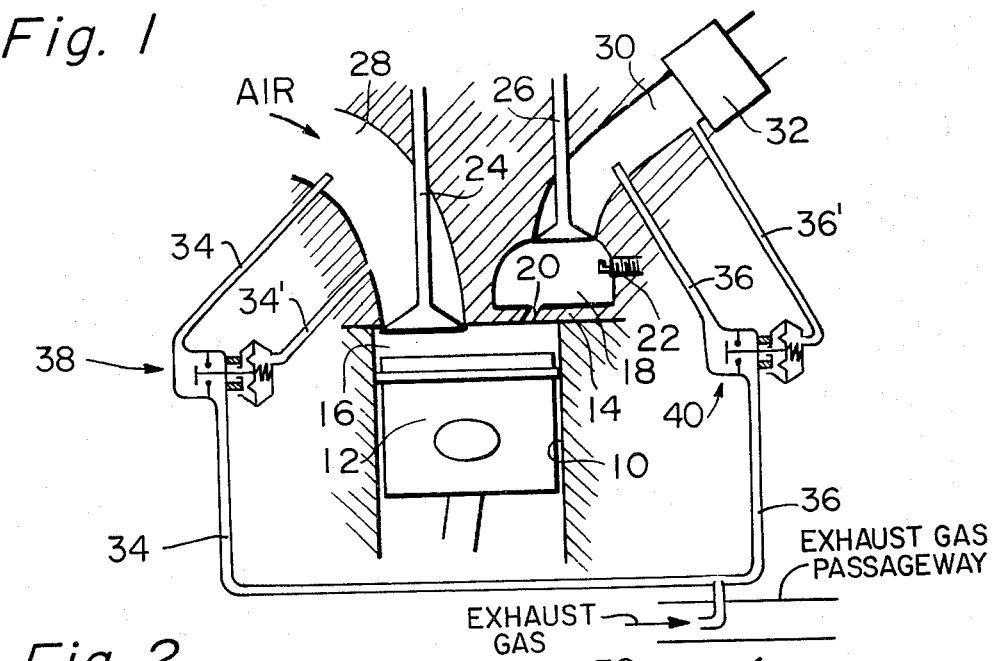

United States Patent

Tange et al.

[11] 3,908,618
[45] Sept. 30, 1975

[54] TORCH-IGNITION RECIPROCATING-PISTON TYPE INTERNAL COMBUSTION ENGINE

[75] Inventors: Shoji Tange; Meroji Nakai, both of Yokohama, Japan

[73] Assignee: Nissan Motor Company Limited, Yokohama, Japan

[22] Filed: Feb. 25, 1974

[21] Appl. No.: 445,161

[30] Foreign Application Priority Data
Feb. 26, 1973  Japan.................................. 48-22971

[52] U.S. Cl. ........ 123/119 A; 123/32 ST; 123/75 B; 123/DIG. 4
[51] Int. Cl.² ......................................... F02B 25/06
[58] Field of Search .......... 123/119 A, 32 ST, 32 C, 123/32 SP, 32 SPA, 48 D, 191 S, 191 SP, DIG. 4, 75 B

[56] References Cited
UNITED STATES PATENTS

| | | | |
|---|---|---|---|
| 3,294,073 | 12/1966 | Bressan............................ | 123/119 A |
| 3,408,992 | 11/1968 | Von Seggern et al........... | 123/32 ST |
| 3,633,553 | 1/1972 | Holzapfel....................... | 123/119 A |
| 3,799,130 | 3/1974 | Dohlstrom...................... | 123/119 A |
| 3,809,039 | 5/1974 | Alquist............................ | 123/119 A |

*Primary Examiner*—Wendell E. Burns
*Assistant Examiner*—David D. Reynolds

[57] ABSTRACT

Exhaust gas is recirculated into the engine combustion chamber under high load engine operation, and into an antechamber having ignition means therein and opening into the combustion chamber under medium and high load engine operation to cool the respective chambers and inhibit formation of nitrogen oxides.

1 Claim, 2 Drawing Figures

U.S. Patent  Sept. 30, 1975  3,908,618

TORCH-IGNITION RECIPROCATING-PISTON TYPE INTERNAL COMBUSTION ENGINE

The present invention relates to a torch-ignition, reciprocating piston internal combustion engine having an improved exhaust gas recirculation system.

Due to the high temperature of combustion in a main combustion chamber and an antechamber of internal combustion engines of the above mentioned type, nitrogen oxides are formed by combination of nitrogen and oxygen from the air in both the main combustion chamber and the antechamber. Nitrogen oxides are poisonous, and reduction of their concentration in exhaust gases from internal combustion engines is the subject of legislation or proposed legislation in several countries For inhibiting the formation of nitrogen oxides, a conventional torch-ignition reciprocating-piston type internal combustion engine is provided with a reciculation passageway leading from an exhaust system, for example from an exhaust pipe thereof, to an intake manifold through which air or an air-fuel mixture normally passes into a main combustion chamber, to recirculate a portion of the exhaust gas into the main combustion chamber for mixture with the air or the air-fuel mixture. In this type of engine, during a compression stroke, a portion of the exhaust gas from the main combustion chamber may enter the antechamber. However, it is hardly possible to recirculate an appropriate amount of exhaust gas into the antechamber and also optimize the proportion of exhaust gas to residual charge within the main combustion chamber because of the inherent construction of the engine. Hence, it can not be expected in a conventional torch-ignition reciprocating-piston type internal combustion engine to reduce considerably the concentration of nitrogen oxides without increasing unburned constituents including hydrocarbons and carbon monoxide.

It is accordingly an object of the present invention to reduce the concentration of nitrogen oxides in exhaust gas issuing from a torch-ignition reciprocating-piston type internal combustion engine, in combination with reducing unburned constituents of the exhaust gas.

Figure 2:
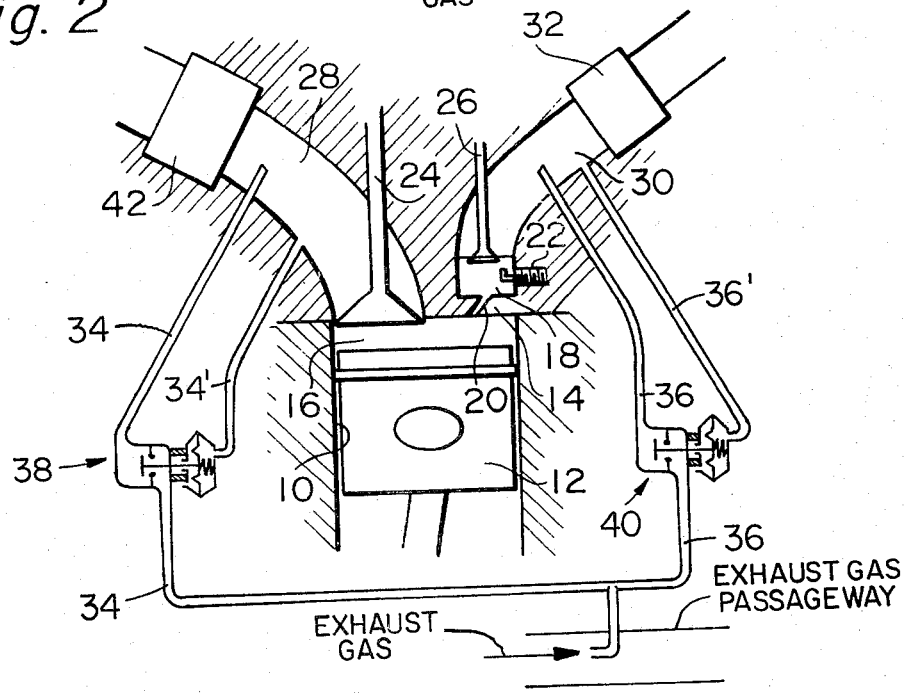

The above and other objects and features of the present invention will become clear from the following description of two torch-ignition reciprocating-piston type internal combustion engines embodying the present invention in conjunction with the accompanying drawing, in which:

FIG. 1 is a fragmentary longitudinal sectional view of a torch-ignition reciprocating-piston type internal combustion engine embodying the invention; and FIG. 2 is a similar view of another torch-ignition reciprocating-piston type internal combustion engine embodying the invention.

Referring to FIG. 1, only one cylinder arrangement of a torch-ignition internal combustion engine is shown for the sake of simplicity, although the engine is usually provided with a plurality of substantially identical cylinder arrangements which are combined in an integral block.

As shown, the engine includes an engine cylinder 10, a piston 12 reciprocally slidable in the bore of the cylinder 10 and a cylinder head 14 mounted above the piston 12 to provide a main combustion chamber 16, as is customary. The cylinder head 14 has an antechamber 18 communicating the main combustion chamber 16 through a constriction 20, which has mounted therein ignition means such as a spark plug 22. The engine further includes a main inlet valve 24, an auxiliary inlet valve 26 and an exhaust valve (not shown), which are opened and closed in a known manner. There are also provided a first or main combustible mixture constituent induction, passageway 28 and a second or auxiliary combustible mixture constituent induction passageway 30. The main induction passageway 28 leads from an air-filter (not shown) into the main combustion chamber 16 past the main inlet valve 24, whereas the auxiliary induction passageway 30 leads from a rich set carburettor, which is schematically shown as 32, into the antechamber 18 past the auxiliary inlet valve 26. It is essential that the volumes of the antechamber 18 be 40 to 80 percent that of the main combustion chamber 16 at TDC of the piston 12. It is possible that instead of the carburettor 32, a fuel injector may open into the auxiliary induction passageway 30. As the engine described above is well known in the art, description of the operation thereof will be ommitted for the sake of simplicity.

For recirculating exhaust gas into the main combustion chamber 16, a first recirculation passageway or pipe 34 is arranged to lead from the exhaust system, such as from an exhaust pipe or passageway thereof, into the main induction passageway 28. For recirculating exhaust gas into the antechamber 18, a second recirculation passageway or pipe 36 leads from the exhaust pipe into the auxiliary induction passageway 30. The first pipe 34 is provided with a first flow control valve 38 arranged to open only during high engine load operation. The second pipe 36 is provided with a second flow control valve 40 arranged to open only under medium and high engine load operation. The first and second valves 38 and 40 respectively are responsive to the engine load by sensing, for example, the vacuum in the induction system.

The valve structures 38 and 40 are diaphragm operated valves having a spring loaded diaphragm and a normally open valve disposed in an exhaust gas recirculation passageway. The spring loaded side of the diaphragm is connected to an induction passageway and the spring load is determined so that when vacuum in the induction passageway exceeds a predetermined value the diaphragm urges the valve to its closed position, thereby shutting off the recirculation passageway. Thus as seen in the Figures the first valve 38 is connected by means of pipe 34' to induction passageway 28 and the second valve 40 is connected by means of pipe 36' to auxiliary induction passageway 30.

Referring to FIG. 2 the engine shown is different from that of FIG. 1 in that the aantechamber 18 has a volume ranging from 5 to 50 percent that of the main combustion chamber 16 at TDC of the piston 12, and in that a lean set carburettor 42 is provided in the main induction passageway 28 to supply a lean mixture into the main combustion chamber 16 past the main inlet valve 24.

In each of the torch-ignition type internal combustion engines described with reference to FIGS. 1 and 2, during no load engine operation (idling) and during low speed and light load engine operation, both valves 38 and 40 will close so that recirculation of exhaust gas into the main combustion chamber 16 and the antechamber 18 respectively is prevented, so that misfiring or extinguishing of the flame will not result. Since during these engine operating conditions the combustion temperature in both the main combustion chamber 16 and the antechamber 18 is low, formation of nitrogen oxides is negligible. During medium engine load operation, the second valve 40 is opened to recirculate exhaust gas into the antechamber 18 to prevent an excessive temperature rise therein. Hence, nitrogen oxide formation is reduced during this engine operating condition. Moreover, during this engine operating condition, the combustion temperature in the main combustion chamber 16 is not so high that recirculation of exhaust gas thereinto is necessary. During high engine load operation, both the valves 38 and 40 are opened to recirculate exhaust gas into the main combustion chamber 16 and the antechamber 18 respectively.

It will now be appreciated that the present invention provides reduction of the concentration of nitrogen oxides in exhaust gas without increasing the hydrocarbon and carbon monoxide concentrations in the exhaust gas since proper amounts of exhaust gas are recirculated into the antechamber 18 and the main combustion chamber 16 separately when necessary.

What is claimed is:

1. A torch-ignition internal combustion engine of the type having a cylinder with a piston reciprocally slidable therewithin, a cylinder head defining a combustion chamber in conjunction with the cylinder and the piston, a first combustible mixture constituent induction passageway opening into the combustion chamber, a second combustible mixture constituent induction passageway opening into an antechamber formed in the cylinder head having ignition means therewithin, the antechamber opening into the combustion chamber through a constriction, and an exhaust gas passageway leading from the combustion chamber to the atmosphere, comprising:
 a first recirculation passageway leading from the exhaust gas passageway into the first induction passageway and having a first valve therewithin; and
 a second recirculation passageway leading from the exhaust gas passageway into the second induction passageway and having a second valve therewithin;
 said first and second valves being adapted to be responsive to the engine load, whereby said first valve opens only under high load engine operation to recirculate exhaust gas into the combustion chamber, and said second valve opens only under medium and high load engine operation to recirculate exhaust gas into the antechamber.

* * * * *